Jan. 16, 1968 J. C. HANBURY 3,363,740

ARTICLE HANDLING APPARATUS

Original Filed Aug. 11, 1965 3 Sheets-Sheet 1

INVENTOR
JOHN C. HANBURY

By Cushman, Darby & Cushman
ATTORNEYS

Jan. 16, 1968   J. C. HANBURY   3,363,740
ARTICLE HANDLING APPARATUS
Original Filed Aug. 11, 1965   3 Sheets-Sheet 2

INVENTOR
JOHN C. HANBURY

BY
Cushman, Darby & Cushman
ATTORNEYS

Jan. 16, 1968  J. C. HANBURY  3,363,740
ARTICLE HANDLING APPARATUS
Original Filed Aug. 11, 1965  3 Sheets-Sheet 3

INVENTOR
JOHN C. HANBURY
BY Cushman, Darby & Cushman
ATTORNEYS

United States Patent Office 3,363,740
Patented Jan. 16, 1968

3,363,740
ARTICLE HANDLING APPARATUS
John C. Hanbury, P.O. Box 307, Prince George,
British Columbia, Canada
Continuation of application Ser. No. 480,546, Aug. 11, 1965. This application Apr. 25, 1967, Ser. No. 633,637
Claims priority, application Canada, Aug. 18, 1964, 909,731
10 Claims. (Cl. 198—34)

ABSTRACT OF THE DISCLOSURE

An article handling apparatus comprising an inclined conveyor having a first set of conveyor chains inclined at a first angle to the horizontal which travel up the conveyor and support an article thereon, the first angle being greater than the angle of repose of the article on the conveyor and of one article on another article. Also included is a second set of conveyor chains inclined at a second angle to the horizontal which is greater than the first angle. The second set of conveyor chains also travel up the conveyor. The first and second sets of conveyor chains converge toward each other at the top of the conveyor. There is provided on the second set of conveyor chains a plurality of lugs, each lug extending across the conveyor normal to the direction of the movement of the conveyor so that the lugs project above the first set of conveyor chains at the bottom of the conveyor sufficiently only to engage and support a single article. The lugs also project at the top of the conveyor to a greater extent so as to assist movement of an article over the top of the conveyor.

---

Figure 1:
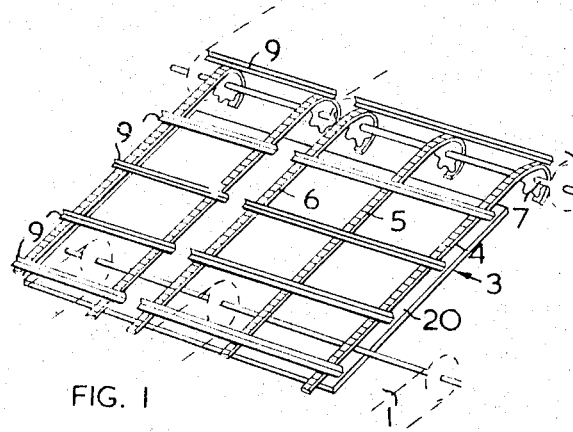

This is a continuation of S.N. 480,546, filed Aug. 11, 1965.

This invention relates to article handling apparatus and particularly, but not exclusively, relates to lumber handling apparatus.

The handling of articles in industry by means of conveyors is sometimes subject to difficulties. This is especially true in the lumber handling industry when a multiple chain conveyor having a plain surface, commonly known as a "transfer," is used to move lumber in a direction substantially perpendicular to its length. The pieces of lumber may be carried along the conveyor lying at any angle to the direction of movement of the conveyor. This is, of course, a considerable disadvantage and is largely due to the difficulty of feeding lumber rapidly from a machine or even by hand on to such a conveyor so that each piece lies separately upon the conveyor normal to its direction of movement, particularly if the conveyor is being fed or loaded at more than one point.

It is an object of the invention to provide article handling apparatus which is particularly suitable for use in the lumber handling industry and in which the above-mentioned disadvantage is obviated or substantially reduced.

According to a first aspect of the invention, there is provided article handling apparatus comprising an inclined conveyor having a plurality of lugs each of which extends across the conveyor normal to the direction of movement of the conveyor, said lugs each projecting from the conveyor sufficiently only to engage and support a single article, the angle of incline of the conveyor being greater than the angle of repose of the article on the conveyor and of one article on another article.

The invention also provides article handling apparatus comprising an inclined conveyor having one or more conveyor chains and a plurality of lugs each of which extends across the conveyor normal to the direction of movement of the conveyor, said lugs each projecting from the conveyor sufficiently only to engage and support a single article, the angle of incline of the conveyor being greater than the angle of repose of the article on the conveyor and of one article on another article.

More specifically, the invention provides article handling apparatus comprising an inclined conveyor having a first set of conveyor chains inclined at a first angle to the horizontal and adapted to travel up the conveyor and support an article thereon, a second set of conveyor chains inclined at a second angle to the horizontal greater than said first angle and adapted to travel up the conveyor, whereby said first and second sets of conveyor chains converge towards each other at the top of the conveyor, a plurality of lugs supported on the second set of conveyor chains, each lug extending across the conveyor normal to the direction of movement of the conveyor, whereby said lugs project above the first set of conveyor chains at the bottom of the conveyor sufficiently only to engage and support a single article and project at the top of the conveyor to a greater extent so as to assist movement of an article over the top of the conveyor, said first angle of incline being greater than the angle of repose of the article on the conveyor and of one article on another article.

It will be appreciated that said article handling apparatus may be lumber handling apparatus.

Figure 2:
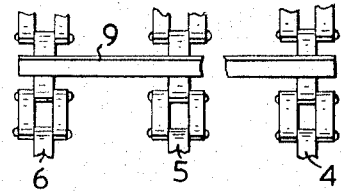
Figure 3:
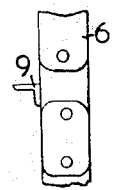
Figure 4:
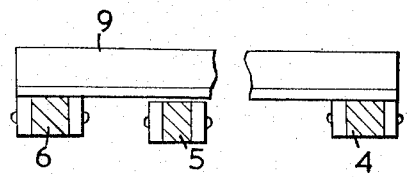
Figure 5:
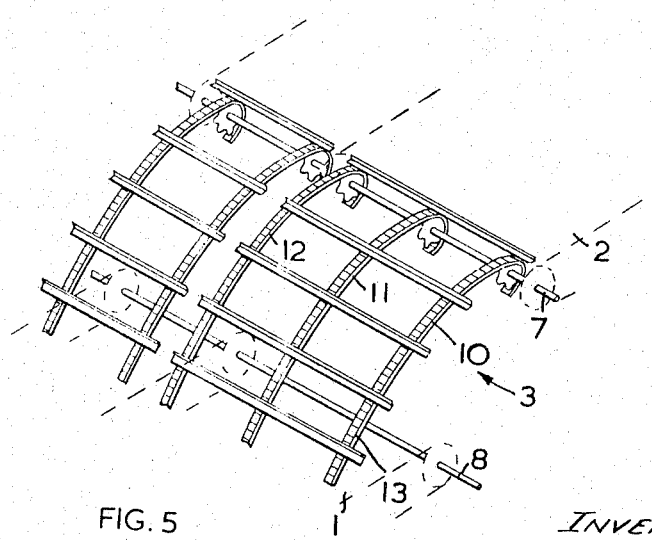
Figure 6:
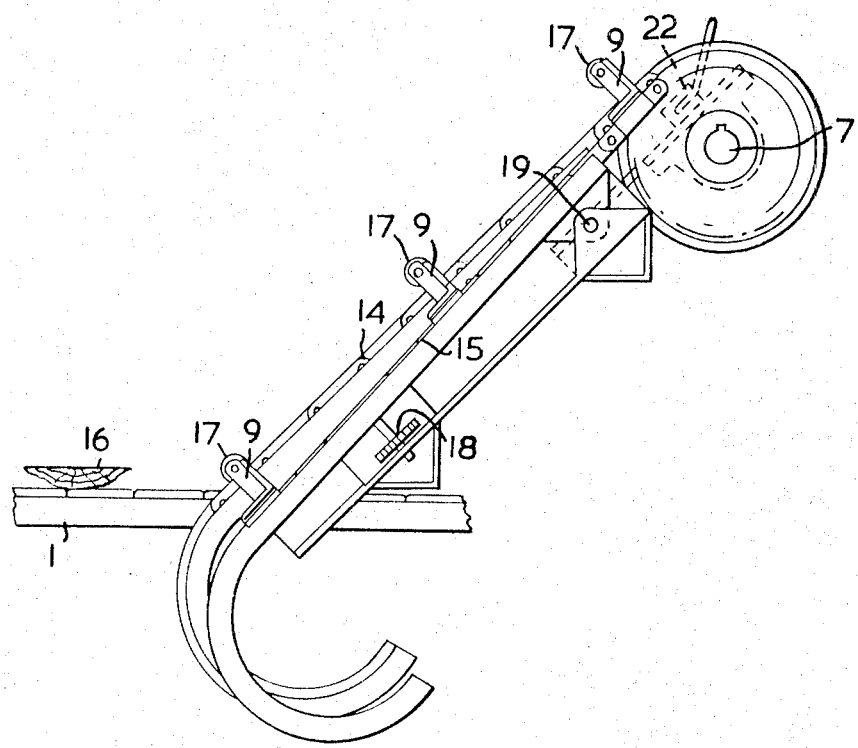
Figure 7:
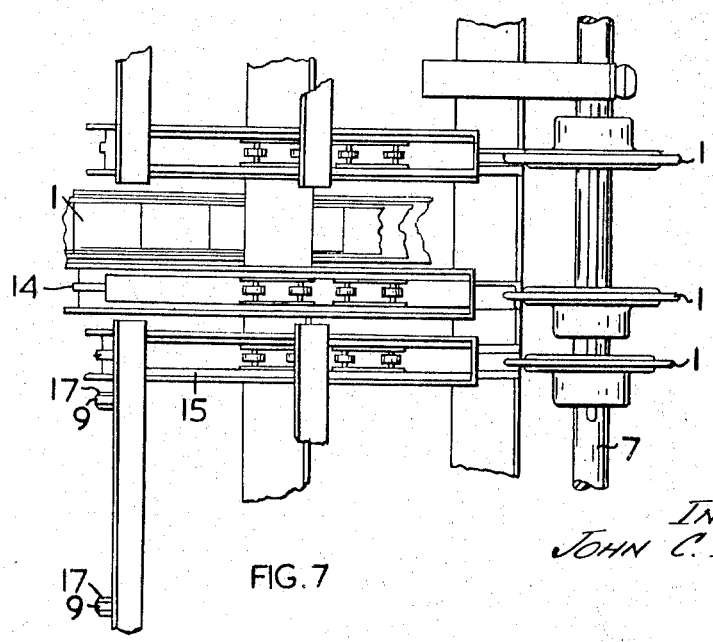
Figure 8:
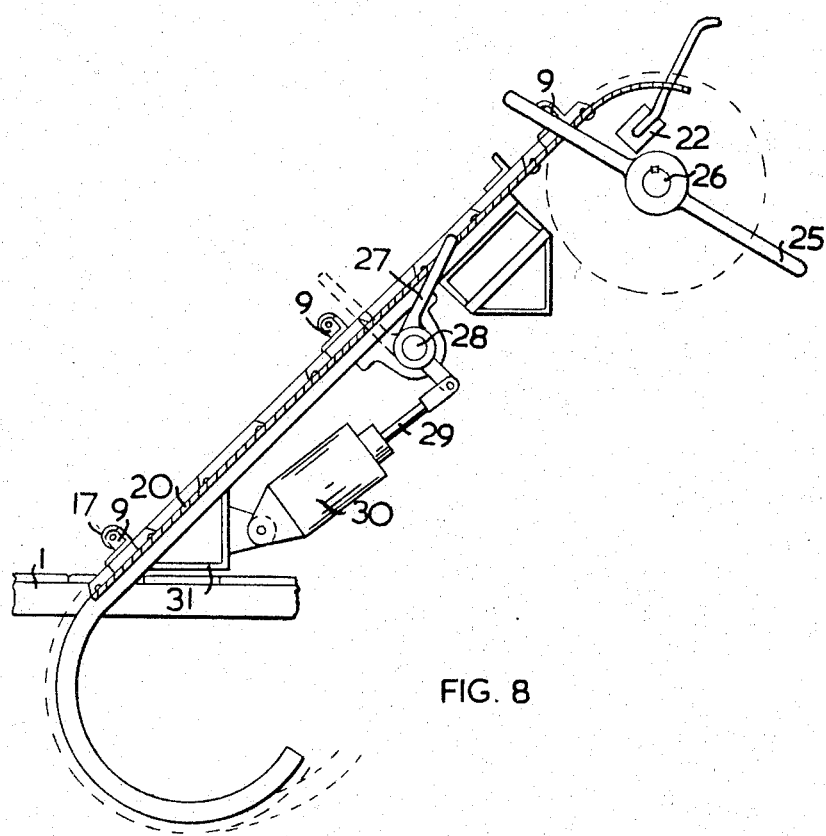

The invention will now be described, by way of example, with reference to the accompanying drawings in which:

FIGURE 1 is a perspective view of lumber handling apparatus according to one embodiment of the invention, FIGURE 2 is a plan view of part of the apparatus of FIGURE 1 showing three conveyor chains and a lug extending thereacross, FIGURE 3 is a side view illustrating the cross-sectional shape of a lug, FIGURE 4 is an end view of the conveyor chains and a lug illustrated in FIGURE 2, FIGURE 5 is a perspective view similar to FIGURE 1 but illustrating a modified conveyor according to the invention, FIGURE 6 is a side view of lumber handling apparatus utilizing two sets of conveyor chains according to the invention, FIGURE 7 is a plan view of the apparatus shown in FIGURE 6, FIGURE 8 is a side view of lumber handling apparatus according to the invention illustrating three additional features which may be provided.

The lumber handling apparatus illustrated in FIGURE 1 is shown between an input conveyor 1 and an output conveyor 2 and comprises an inclined conveyor 3 formed by a plurality of conveyor chains, such as 4, 5 and 6. A plurality of lugs 9 is provided on the conveyor chains and each extends normal to the direction of movement of the conveyor. The apparatus is designed to receive lumber in a "jumbled, piled-up" state from the input conveyor 1 and to provide each piece of lumber separate from the rest on the output conveyor 2 orientated and arranged so that the lumber extends substantially normal to the direction of movement of the conveyor.

Each of the conveyor chains passes over one of a plurality of drive sprocket wheels mounted on a common drive shaft 7. Further sprocket wheels are provided, as shown, on the common drive shaft 7 and are associated with the output conveyor 2. A similar drive shaft 8 for the input conveyor 1 is provided at the lower end of the inclined conveyor 3.

Each of the plurality of lugs 9 is spaced from the next by a distance greater than the width of the lumber to be handled and is attached to and supported by a plurality of chains such as 4 and 6, although it will be understood that by suitable design each lug may be attached to only one chain if desired. FIGURES 2, 3 and 4 show the lugs 9 in greater detail. As shown in FIGURE 3 each lug 9 is of substantially L-shaped cross-section and in FIGURES 2 and 4 a lug 9 is shown attached to the chains 4 and 6 but not attached to the chain 5. The chain 5 can therefore be regarded as a supporting idler chain.

Each lug 9 projects above the conveyor chain a distance sufficient only to support a single piece of lumber and carry it up the conveyor 3 but not sufficient to support two pieces of lumber. The lug projection above the conveyor chain is such that it is less than the thickness of the thinnest piece of lumber to be handled.

The angle of the conveyor chains 4, 5 and 6 to the horizontal (i.e. the angle of incline) is greater than the angle of repose of lumber on the conveyor 3 and is also greater than the angle of repose of one piece of lumber on another piece of lumber. The inclination of the conveyor and the longitudinal extension of the lugs across the conveyor results in the lumber being orientated with its length normal to its direction of travel. If desired, a stationary platform 20 may be provided beneath the conveyor chains.

In operation lumber is fed along the feed chains of the input conveyor 1, usually in a jumbled, piled-up state so that at the base of the conveyor 3 there is a jumbled assortment of lumber. The leading end of a piece of lumber being fed along the input conveyor 1 usually lies at an angle which is not normal to the direction of travel of the conveyor and it is stopped against the chains or the stationary platform of the inclined conveyor. This end may be raised slightly by one of the lugs but, as the lumber is not lying parallel to the lugs, the end is not firmly held by the lug but slides over it due to gravity and drops back onto the feed chains of the input conveyor 1. This action is repeated until the lumber is orientated parallel to the lugs and forced against the sloping conveyor by the pressure applied uniformly along its length by the feed chains. Only then can the piece of lumber be held by one of the lugs and carried up the incline. The piece of lumber rests on the chain of the inclined conveyor and the respective lug. Rotation imparted to the common drive shaft 7 moves the conveyor chains such as 4, 5 and 6 together with the associated lugs 9 up the incline.

Usually, however, the lumber is fed along the input conveyor 1 in a jumbled, piled-up state so that at the base of conveyor 3 there is a jumbled assortment of lumber.

Any protruding ends or edges of the articles not lying parallel to the lugs on the leading side of the pile of articles are raised a short distance by the lugs on coming into contact before sliding over the top of the lugs and falling back by gravity with them. This action combined with the pressure uniformly applied towards the sloping conveyor throughout the length of the pile of articles by the feed chains causes the articles in turn to become oriented parallel to the lugs, in which position they may be individually held by the lugs and carried up the inclined conveyor.

Uniform pressure throughout the length of the lumber applied towards the inclined conveyor may also be attained by sliding the lumber down a platform or skids sloped at an angle greater than the angle of repose of lumber on the platform or skids. The steepness of this angle may be reduced by mounting freely rotating rollers on the surface of the platform or skids.

It should be noted that in practice lumber will cease to be carried up the inclined conveyor 3, should the feed conveyor 1, be stopped even though a considerable number of pieces of lumber be accumulated at the base of conveyor 3, since pressure against conveyor 3 is in use applied to the lumber by the input conveyor 1, for the lumber to be picked up by the lugs.

The angle of incline of the conveyor chain 3 is greater than the angle of repose of the lumber on the conveyor chains and also greater than the angle of repose of one piece of lumber on another piece of lumber and therefore if a second piece of lumber rests on top of the first piece of lumber on the conveyor it will not remain there but will slip off the conveyor 3.

When the respective piece of lumber arrives at the top of the conveyor 3, it drops onto the output conveyor 2 and, due to the action of the lugs on the conveyor 3, it now travels along the conveyor 2 with its longitudinal axis normal to the direction of movement of the conveyor 2. Each piece of lumber is separate from the next and this is, of course, a considerable advantage for subsequent handling of the lumber.

The apparatus may also be used, for example, to deliver lumber to skids, rolls, or a transverse belt, or directly to a machine such as an edger, resaw, drop-sorter, lumber stacker, trimmers, planer, etc.

When the apparatus is used to feed lumber to a lumber manufacturing machine such as an edger or resaw, it is an advantage to have one piece only delivered to the machine as needed. When this piece of lumber has been passed through the edger or resaw another single piece is delivered. This cycle may easily be attained by placing a sensing device 22 adjacent to the point of delivery of lumber over the top of the inclined conveyor which stops the drive motor upon the delivery of a piece of lumber. The drive motor is restarted either manually by the operator or automatically by a second sensing device which becomes operative when the piece of lumber reaches a given position or when some moving link of the manufacturing machine attains a given position. For example, this second sensing device might be operated by the complete closing of the feed rolls of either an edger or a resaw; such closing would occur only when the lumber had cleared the machine.

It may sometimes happen that when a piece of lumber is at the top of the conveyor 3, its shape and/or size is such that it does not readily drop onto the output conveyor 2. It may even fall backwards down the conveyor 3 which is of course a considerable disadvantage. FIGURE 5 shows a modified conveyor which has been designed to overcome this disadvantage. Instead of using straight conveyor chains 4, 5 and 6 in FIGURE 1, the conveyor in FIGURE 5 utilizes curved chains such as 10, 11 and 12 which have an initial substantially straight section 13 followed by a curved section as shown in the figure. In operation, a piece of lumber is picked up on a lug and travels up the conveyor. Due to the curving of the conveyor chains it is travelling substantially parallel to the output conveyor 2 as it reaches the top of the inclined conveyor 3. There is thus less tendency for the lumber to fall backwards down the inclined conveyor 3.

In FIGURES 6 and 7 there is shown a lumber handling apparatus which uses two sets of converging conveying chains which in combination with the lugs ensure that lumber is passed over the inclined conveyor 3 and onto the output conveyor. The first set of said conveyor chains consists of a plurality of single chains 15 which are spaced apart across the width of the inclined conveyor. These chains 14 carry no lugs and are the uppermost chains in FIGURE 6. Between each pair of chains 14 there is provided a plurality of chains of the second set.

There chains 15 have attached thereto the lugs 9 in a similar manner to the conveyor chains of FIGURE 1. The conveyor chains 15 are initially inclined to the horizontal at a greater angle than the chains 14 of the first set and as seen in FIGURE 6 are the lowermost chains. The lugs 9 initially project above the level of the chains 14 only a sufficient amount to engage and support a single piece of lumber. However, as the two sets of chains 14 and 15 travel up towards the top of the inclined conveyor, they converge towards each other so that the lugs 9 project above the level of the chain 14 by an increased amount. Therefore, as each lug 9 reaches the top of the inclined conveyor its projection above the chains 14 is sufficient to ensure that the respective piece of lumber is passed over the conveyor sprocket wheels mounted on drive shaft 7 (FIG. 7), and onto the output conveyor and that the piece of lumber does not topple backwards down the inclined conveyor. By way of example, a piece of lumber 16 is shown on the input conveyor 1.

The lugs in FIGURES 6 and 7 are provided with rollers 17, as shown. The primary purpose of these rollers is to prevent a piece of lumber being carried up the conveyor with its leading edge resting on the conveyor chains and its bottom face resting on the top of a lug. With no rollers this is possible since the bottom face of the lumber will be at an angle less than the angle of repose of lumber upon the chains or the lug. As the upper face of this piece of lumber is also at an angle less than the angle of repose of one piece of lumber upon another, a second piece of lumber may rest thereon and be carried up the incline, which is an undesirable occurrence. A secondary purpose of these rollers is to assist in the rejection over the top of the lug of a piece of lumber temporarily picked up by a lug by one end only, it being not parallel to the lug.

The angle is inclined of the chain 15 of the second set may be adjusted by means of a screw and nut arrangement 18 (FIG. 6), by means of which chainways on which the chains 15 are mounted can be pivoted about a pivot point 19. Thus the projection of the lugs 9 above the conveyor chains 14 at the bottom of the inclined conveyor can be altered in order to suit the size and/or shape of the lumber to be handled by the conveyor. For example, different heights of lug projection may be required when handling rough lumber or finished lumber.

Instead of providing the screw and nut arrangement 18 to alter the position to the horizontal of the second set of chains 15, the control air cylinder connected to the conveyor by associated bell-crank levers may be provided. Furthermore, instead of adjusting the angle of the second set of chains 15, adjustment may be provided for the first set of chains 14.

The provision of two sets of conveyor chains is particularly advantageous when a piece of lumber 16 from the outside of a log is on the input conveyor 1 with its curved surface downwards. If the distance which a lug projects is insufficient, then it can be increased by suitable adjustment of the first set of conveyor chains so as to ensure that the curved piece of lumber is caught on the conveyor. For normal pieces of lumber the first set of conveyor chains is returned to its normal position.

FIGURE 8 shows another method of ensuring that pieces of lumber pass over the top of the inclined conveyor on to the output conveyor. A support arm 25 is provided on the top drive shaft 26 and is synchronized with the arrival of a lug 9 at the top of the inclined conveyor. This may easily be done if the drive sprocket wheels have a number of teeth equal to an integral multiple of the number of conveyor chain pitches between corresponding points on successive lugs. It is arranged so that as a lug carries a piece of lumber to the top of the inclined conveyor one extension on the support arm 25 rotates so as to come behind that piece of lumber to prevent it falling backwards down the conveyor and to urge it off the inclined conveyor and onto the output conveyor if such is provided.

FIGURE 8 also shows a reject arm 27 which is provided to reject an unwanted piece of lumber which has somehow managed to get on to the inclined conveyor. The reject arm 27 is mounted on a shaft 28 and is operated, via suitable valves and controls, by a plunger 29 in a cylinder 30 which is mounted on a frame member 31.

The reject arm may be utilized by the operator to reject one or both pieces of lumber when a second piece of lumber has been trapped ahead of the first piece of lumber supported by one of the lugs 9. Alternatively, a pair of limit sensing switch devices may be provided spaced apart along the length of the conveyor by a distance somewhat greater than the width of the lumber to be handled. Then, if a second piece of lumber somehow becomes trapped in front of a first piece of lumber supported by a lug giving a total width greater than the distance between switch devices, both switch devices will be actuated together and this will operate the reject arm to reject one or both pieces of lumber. Other sensing devices may be provided on the conveyor to detect other faulty conditions and reject the respective piece of lumber, for example, a piece of lumber which has lodged on edge upon the conveyor.

If desired, a plurality of reject arms 27 may be provided along the width of the conveyor and mounted on a common shaft 28 and either operated by a single cylinder 30 or by a plurality of such cylinders.

If will be seen that the lugs 9 are again shown as having roller wheels 17.

It will be appreciated that the roller wheels 17, if provided on the lug 9, are operative to reduce the effective angle of repose of a piece of lumber on the lugs. In some instances in which the conveyor is installed having a calculated angle of incline it may occasionally be desired to utilize the same conveyor with articles, e.g. pieces of lumber, which have an angle of repose on the conveyor which is greater than the angle of incline at which the conveyor is actually installed. It will obviously be too expensive and too complicated an operation to install a new conveyor suitable for the new articles. One solution is to reduce the effective angle of repose of the article, i.e., piece of lumber on the inclined conveyor. This may be done by providing rollers or a tetrafluoroethylene coating on the conveyor chains in order to reduce the friction between the piece of lumber and the conveyor. The inclined conveyor could then be used in accordance with the present invention.

An alternative method of reducing the effective angle of repose of the piece of lumber on the conveyor is to reciprocate or vibrate the conveyor. This can be done by attaching one or more powered mechanical, electrical, pneumatic or hydraulic vibrators to the conveyor.

One time when it may be necessary to reduce the effective angle of repose is when it is required to handle, for example, extremely rough surfaced lumber after the initial sawing of the lumber. The effect of friction on such a rough piece of lumber may be so great that the angle of repose of the lumber on the conveyor is greater than 45°. Particularly if the luber is of square cross section it may be inconvenient to design a conveyor having an incline which is far in excess of 45°. A further example of a situation in which it may be desirable to reduce the effective angle of repose is when one has a conveyor which was designed primarily to handle dressed or planed lumber having a small angle of repose and it is now desired to handle rough lumber which has a much larger angle of repose.

There may sometimes be a tendency for pieces of lumber, especially if thin and flexible, to bend down between the conveyor chains. By providing a stationary platform beneath the chains this disadvantage can be substantially overcome. This platform is also needed to arrest the forward motion of the leading end of a piece of lumber being fed to the inclined conveyor 3, while lying on the input conveyor 1, not normal to its direction of travel. The platform also supports pieces of lumber shorter than the distance between the chains 4, 5 and 6 of the inclined conveyor while they are being carried up the slope by the lugs 9.

If a platform is used, the effective angle of repose of a piece of lumber on the conveyor may be reduced by mounting rollers on the platform.

For different articles it may be necessary to provide lugs having a different cross-sectional shape. For example, for handling round bars, the lugs may be of substantially U-shaped cross-section so that the bar can rest in the U. The lagging leg of the U-shaped lug may be thicker than the leading leg of the lug and also longer so that it can support a bar. Rollers may, if desired, be provided on the end of the lagging leg and succeeding U-shaped lugs may be positioned closely adjacent each other or may be spaced apart a small distance.

Alternatively each lug may be in the shape of a trapezoidal or wedge-shape having two parallel surface inclined to the conveyor chains and that surface which is farthest from the conveyor chains and on which the article rests being provided with a plurality of rollers. The leading edge of each lug extends from the conveyor chain a greater distance than the lagging edge of the lug in front of it on the conveyor so that the rear end of the article on the front lug rests against the leading edge of the rear lug. The article (e.g. lumber) will then be carried up the conveyor resting at an angle to the horizontal greater than the angle of incline of the conveyor chains. This increased angle to the horizontal may also be obtained by reducing the spacing between lugs so that the trailing edge of the article rests against a lug while the lower surface of the article near the leading edge rests on top of the lug in front. This reduced lug spacing also tends to reduce the possibility of more than one piece of lumber being carried for each lug.

In some special cases it is not necessary that the lumber be delivered by this mechanism one piece at a time, it being required only to assure a uniform rate of delivery of the lumber or to asure that a fixed maximum feed rate is not exceeded. For example, this requirement must be met when feeding sawmill refuse (slabs, edgings, trimmings) to a chipper or a hog since a large "wad" of refuse fed to either of these machines usually causes the machine to jam or seize up often with considerable damage to the machine.

For such applications it is not necessary that the lug height be restricted to less than the thickness of the thinnest article being handled. The rate of feed for any arbitrarily fixed lug height and spacing is regulated by altering the speed of travel of the lugs through the use of a variable speed drive.

It will be appreciated that the platform 20 shown in FIGURE 1 may be perforated so as to permit refuse from the manufacture of the articles to pass through suitably shaped perforations to a lower point from which it may be removed by appropriate means. For example, with lumber, sawdust, bark or slag may be mixed with the lumber. It is normally convenient to remove this at a point near the bottom of the inclined conveyor as the action of the lugs here normally induces some agitation and turning of the lumber and this tends to separate the refuse from the articles.

It will also be appreciated that the means for feeding lumber to the inclined conveyor may conveniently apply uniform pressure throughout the length of the article towards the inclined conveyor. In addition a plurality of rotatable support arms 25 (FIGURE 8) may be provided on an upper drive shaft of the conveyor for assisting articles over the top of the conveyor.

The ends of the lugs 9 may be tapered to reduce any tendency for an article to become engaged by or marred by a sharp corner of a lug.

Although the invention has been described as applied to the lumber handling industry, it will be appreciated that it is not restricted thereto but may be of general application for the handling of any type of articles.

It will be seen from the above that there is provided article handling apparatus which is particularly suitable for use in the lumber industry and which is designed to receive lumber from a conveyor on which it is lying in random, piled or jumbled condition and deliver it either back to an extension of the same conveyor or to another machine one piece at a time, each piece being normal to its direction of travel. This invention also induces a relatively even rate of flow of the lumber which can in no case exceed a fixed maximum rate of flow. This rate of flow may be changed with ease or set at a desirable fixed value.

What is claimed is:

1. Article handling apparatus comprising an inclined conveyor having a first set of conveyor chains inclined at a first angle to the horizontal and adapted to travel up the conveyor and support an article thereon, a second set of conveyor chains inclined at a second angle to the horizontal greater than said first angle and adapted to travel up the conveyor, whereby said first and second sets of conveyor chains converge towards each other at the top of the conveyor, a plurality of lugs supported on the second set of conveyor chains, each lug extending across the conveyor normal to the direction of movement of the conveyor, whereby said lugs project above the first set of conveyor chains at the bottom of the conveyor sufficiently only to engage and support a single article and project at the top of the conveyor to a greater extent so as to assist movement of an article over the top of the conveyor, said first angle of incline being greater than the angle of repose of the article on the conveyor and of one article on another article.

2. Article handling apparatus according to claim 1 including adjusting means for adjusting the second set of conveyor chains to alter said second angle of incline.

3. Article handling apparatus according to claim 2 wherein said adjusting means comprises a nut and screw arangement for moving the second set of conveyor chains about a pivot.

4. Article handling apparatus according to claim 1, in which each lug is provided with one or more rollers to reduce the tendency for an article to rest on top of the lug.

5. Article handling apparatus according to claim 1, including means for rejecting an unwanted article.

6. Article handling apparatus according to claim 1, including means for feeding the articles to the inclined conveyor.

7. Article handling apparatus according to claim 1, capable of delivering articles one at a time oriented with their length normal to their direction of travel including means for removing articles delivered over the top of the inclined conveyor.

8. Article handling apparatus according to claim 1, capable of delivering articles one at a time oriented with their length normal to their direction of travel, wherein a sensing device is placed adjacent to the top of the inclined conveyor, said sensing device being operative to stop the movement of the inclined conveyor upon the delivery of a single article over the top of the inclined conveyor.

9. Article handling apparatus according to claim 1, capable of delivering articles one at a time oriented with their length normal to their direction of travel wherein a stationary platform is affixed beneath the lugs of the inclined conveyor.

10. Lumber handling apparatus comprising an inclined conveyor having a first set of conveyor chains inclined at a first angle to the horizontal and adapted to travel up the conveyor and support a piece of lumber thereon, a second set of conveyor chains inclined at a second angle to the horizontal greater than said first angle and adapted to travel up the conveyor whereby said first and second sets of conveyor chains converge towards each other at the top of the conveyor, a plurality of lugs supported on the second set of conveyor chains, each lug extending across the conveyor normal to the direction of movement of the conveyor, whereby said lugs project above the first set of conveyor chains at the bottom of the conveyor sufficiently only to engage and support a single piece of lumber and project at the top of the conveyor to a greater extent so as to assist movement of a piece of lumber over the top of the conveyor, said first angle of incline being greater than the angle of repose of the piece of lumber on the conveyor and of one piece of lumber on another piece of lumber.

References Cited

UNITED STATES PATENTS 1,447,423  3/1923  Mascord _____ 198—173

EDWARD A. SROKA, *Primary Examiner.*

EVON C. BLUNK, *Examiner.*